United States Patent
Talha et al.

(10) Patent No.: US 11,681,788 B2
(45) Date of Patent: Jun. 20, 2023

(54) AUTONOMOUS VEHICLE AUTHENTICATION KEY DELIVERY

(71) Applicant: Ford Global Technologies, LLC, Dearborn, MI (US)

(72) Inventors: Mohammad Talha, Canton, MI (US); Ali Hassani, Ann Arbor, MI (US); Hamid M. Golgiri, Livonia, MI (US); Daniel M. King, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 16/566,653

(22) Filed: Sep. 10, 2019

(65) Prior Publication Data

US 2021/0073363 A1    Mar. 11, 2021

(51) Int. Cl.
    G06F 21/32       (2013.01)
    G06F 21/62       (2013.01)
    G06Q 10/02       (2012.01)
    H04W 4/40        (2018.01)
    B60R 25/24       (2013.01)
    B60R 25/25       (2013.01)
    H04W 12/041      (2021.01)
    H04W 12/0433     (2021.01)

(52) U.S. Cl.
    CPC .............. *G06F 21/32* (2013.01); *B60R 25/24* (2013.01); *B60R 25/25* (2013.01); *G06F 21/62* (2013.01); *G06Q 10/02* (2013.01); *H04W 4/40* (2018.02); *H04W 12/041* (2021.01); *H04W 12/0433* (2021.01)

(58) Field of Classification Search
    CPC ..... H04W 4/40; H04W 12/04; H04W 12/041; H04W 12/0433; H04W 12/06; H04W 4/80; G06Q 10/02; B60R 25/24; B60R 25/25; G06F 21/32; G06F 21/44; G06F 21/62
    See application file for complete search history.

(56) References Cited

U.S. PATENT DOCUMENTS

| | | | |
|---|---|---|---|
| 9,691,204 B2 | 6/2017 | Frykman et al. | |
| 9,961,076 B2* | 5/2018 | Stoops | H04L 63/0861 |
| 10,589,719 B1* | 3/2020 | Sohn | G07C 9/21 |
| 10,600,040 B1* | 3/2020 | Eidam | G07F 17/3244 |
| 2012/0154117 A1* | 6/2012 | Nice | H04L 63/101 |
| | | | 340/5.82 |
| 2013/0103482 A1* | 4/2013 | Song | G06Q 30/02 |
| | | | 705/14.26 |
| 2015/0161832 A1 | 6/2015 | Esselink et al. | |
| 2016/0027079 A1* | 1/2016 | Schoeffler | H04L 63/12 |
| | | | 705/325 |
| 2016/0197917 A1* | 7/2016 | Lee | H04L 63/0861 |
| | | | 726/7 |

(Continued)

*Primary Examiner* — Shin-Hon (Eric) Chen
*Assistant Examiner* — Saad Ahmad Abdullah
(74) *Attorney, Agent, or Firm* — Vichit Chea; Brooks Kushman P.C.

(57) ABSTRACT

A server includes one or more processors, programmed to responsive to receiving, from a mobile device of a user, a hailing request that identifies the user as requesting to schedule a ride, select a vehicle to respond to the hailing request based on a capacity to accept an encryption key of the vehicle, the hailing request including a user profile, generate an encryption key to authenticate the mobile device of the user with the vehicle, send the encryption key to both the vehicle and the mobile device to schedule the ride.

11 Claims, 5 Drawing Sheets

(56) References Cited

U.S. PATENT DOCUMENTS

| | | | |
|---|---|---|---|
| 2017/0050617 A1* | 2/2017 | Penilla | H04W 4/44 |
| 2019/0039570 A1* | 2/2019 | Foster | B60R 25/25 |
| 2019/0097794 A1* | 3/2019 | Nix | H04L 9/0816 |
| 2020/0351630 A1* | 11/2020 | Vladimerou | H04L 61/4541 |

* cited by examiner

_US 11,681,788 B2_

AUTONOMOUS VEHICLE AUTHENTICATION KEY DELIVERY

TECHNICAL FIELD

The present disclosure generally relates to vehicle authentications. More specifically, the present disclosure relates to vehicle authentication using a passcode.

BACKGROUND

Ride hailing services have become increasingly popular. A user may hail a ride using a mobile device such as a mobile phone. With the development of autonomous driving technology, a user may be able to hail an autonomous vehicle for a ride. A digital key may be generated and sent to both the vehicle and the mobile device for user authentication. Additionally, a user may use a personal identification number (PIN) for quick access to the autonomous vehicle.

SUMMARY

In one or more illustrative embodiments of the present disclosure, a server includes one or more processors, programmed to responsive to receiving, from a mobile device of a user, a hailing request that identifies the user as requesting to schedule a ride, select a vehicle to respond to the hailing request based on a capacity to accept an encryption key of the vehicle, the hailing request including a user profile, generate an encryption key to authenticate the mobile device of the user with the vehicle, send the encryption key to both the vehicle and the mobile device to schedule the ride.

In one or more illustrative embodiments of the present disclosure, a vehicle includes one or more wireless transceivers; a keypad external to the vehicle; and one or more controllers, programmed to responsive to receiving, via the one or more wireless transceivers, from a server, a mission payload message that identifies a user to schedule a ride, the mission payload message including a passcode and an encryption key, store the passcode and encryption key as an associated pair in a storage of the vehicle, responsive to receiving an input entered via the keypad matching the passcode, form a wireless connection between a mobile device and the one or more wireless transceivers, and authenticate the mobile device over the wireless connection using the encryption key.

In one or more illustrative embodiments of the present disclosure, a method for a server includes responsive to receiving, from a mobile device, a hailing request including a user passcode, selecting a vehicle to respond to the hailing request based on a capacity to accept an encryption key of the vehicle; verifying the user passcode against an existing passcode of a different user scheduled to ride with the vehicle to detect a passcode collision; responsive to detecting a passcode collision, obtaining biometric information of the user from the mobile device; generating an encryption key to authenticate the mobile device with the vehicle; sending the passcode, the encryption key, and the biometric information of the user to the vehicle; and receiving a biometric data update collected by a sensor of the vehicle and store the biometric data update for future use.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
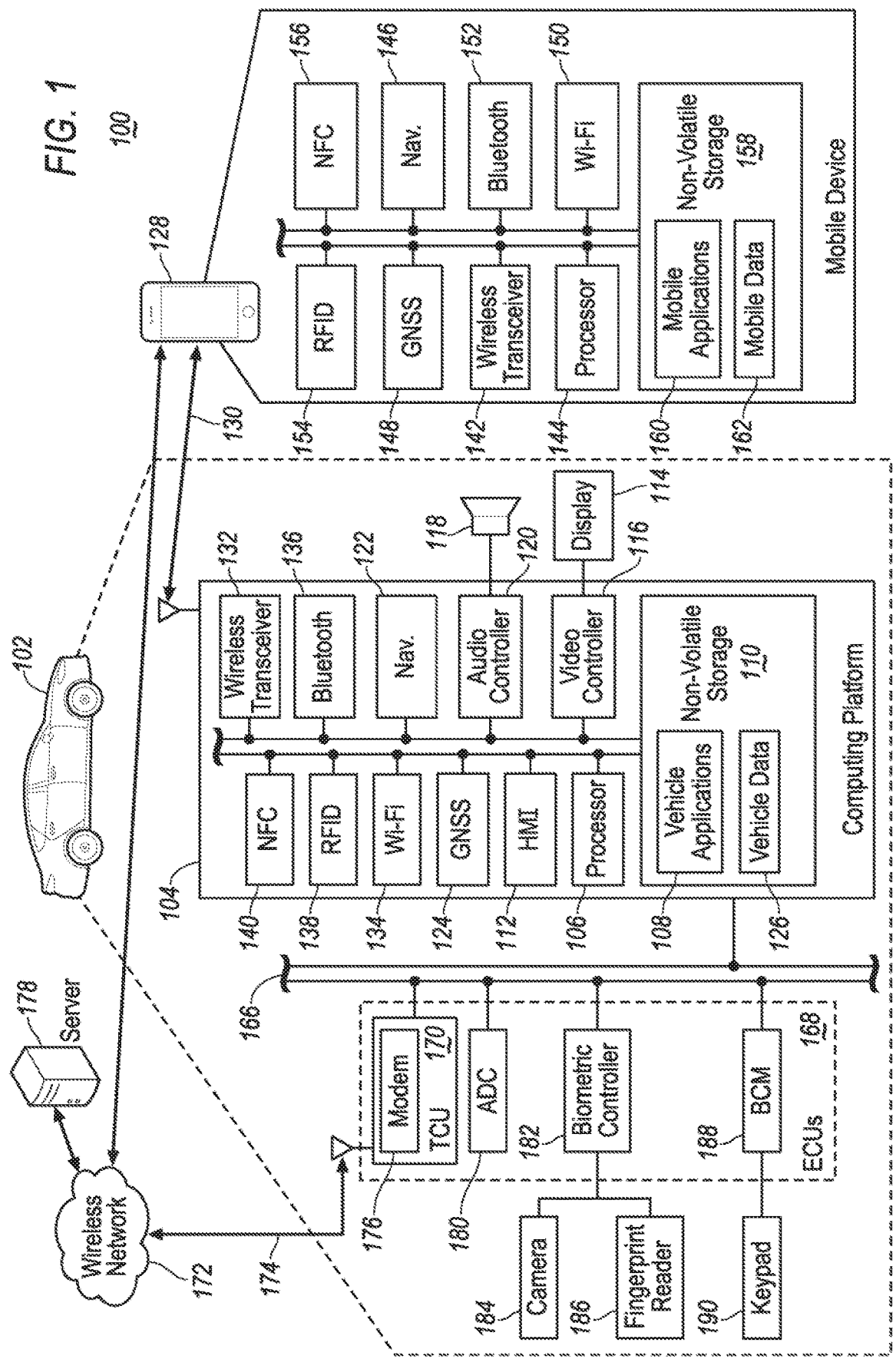
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a system for ride hailing service authentications. More specifically, the present disclosure proposes a system for digital key and PIN authentication for shared ride hailing services.

A hailing service user may use a mobile device application to place an order with an autonomous vehicle for a ride. Responsive to a hailing request from mobile device of the user, a server may identify and select one of multiple autonomous vehicles to respond, and issue a consumer access key (CAK) to both the vehicle and the mobile device for authentications. The CAK may be an encryption key configured for the vehicle and the mobile device to identify and authenticate each other for the scheduled ride. Additionally, a PIN defined by the user may be used for quick identification and access. The PIN may consist of a limited digit of numbers (e.g. a 5-digit number) memorized by the user. Once at the vehicle, the user may manually input the PIN onto an exterior keypad of the vehicle for identification purposes. Since the vehicle may process the PIN faster than authenticate the CAK, the PIN input may allow the vehicle to identify the user faster providing a better user experience. In one example, the CAK and the PIN may remain inactive until a given window prior to the ride pickup time. The CAK and PIN activation and usage may be controlled by an authentication manager implemented by a computer or controller of the vehicle. The authentication manager may keep track of an associated index of each digital key on the authentication device. However, due to the sharing nature of hailing services, the autonomous vehicle may be shared by multiple users. Each user may define his/her own PIN. If multiple users having the same PIN and are assigned to the same autonomous vehicle, the PIN collision may cause confusion on the vehicle side.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or more electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, digital key processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other device capable of communication with the computing platform 104. A wireless transceiver 132 may be in communication with a Wi-Fi controller 134, a BLUETOOTH controller 136, a radio-frequency identification (RFID) controller 138, a near-field communication (NFC) controller 140, and other controllers such as a Zigbee transceiver, an IrDA transceiver, an ultra-wide bandwidth (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a BLUETOOTH controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via BLE, Wi-Fi, UWB, or the like.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The ECUs 168 may further include an autonomous driving controller (ADC) 180 configured to provide autonomous driving features to the vehicle 102. The ADC 180 may be remotely controlled via instructions from the server 178 received via the TCU 170.

The ECUs 168 may further include a biometric controller 182 configured to verify and authenticate biometric information of a user. The biometric controller 182 may be in communication with various biometric sensors configured to collect biometric data of the user. For instance, the biometric sensors may include a camera 184 configured to capture a facial image of the user. The biometric sensors may further include a fingerprint reader 186 configured to collect fingerprints of the user for authentications. The initial enrollment may be done automatically the first time a user rides an autonomous vehicle, where the user may be prompted to perform a series of gestures for biometric acquisition (or alternatively acquisition may happen passively if the sensors are integrated in a collaborative fashion). The ECUs 168 may further include a vehicle body control module (BCM) 188 configured to control various body operations of the vehicle 102. For instance, the BCM 188 may be connected to a keypad 190 exterior to the vehicle body configured to receive a PIN input from the vehicle user for identification and authentication purposes. The keypad 190 include a device or touch interface configured to receive a user touch input. Alternatively, the keypad may be configured to support alphanumeric character inputs for more complex PINs.

Figure 2:
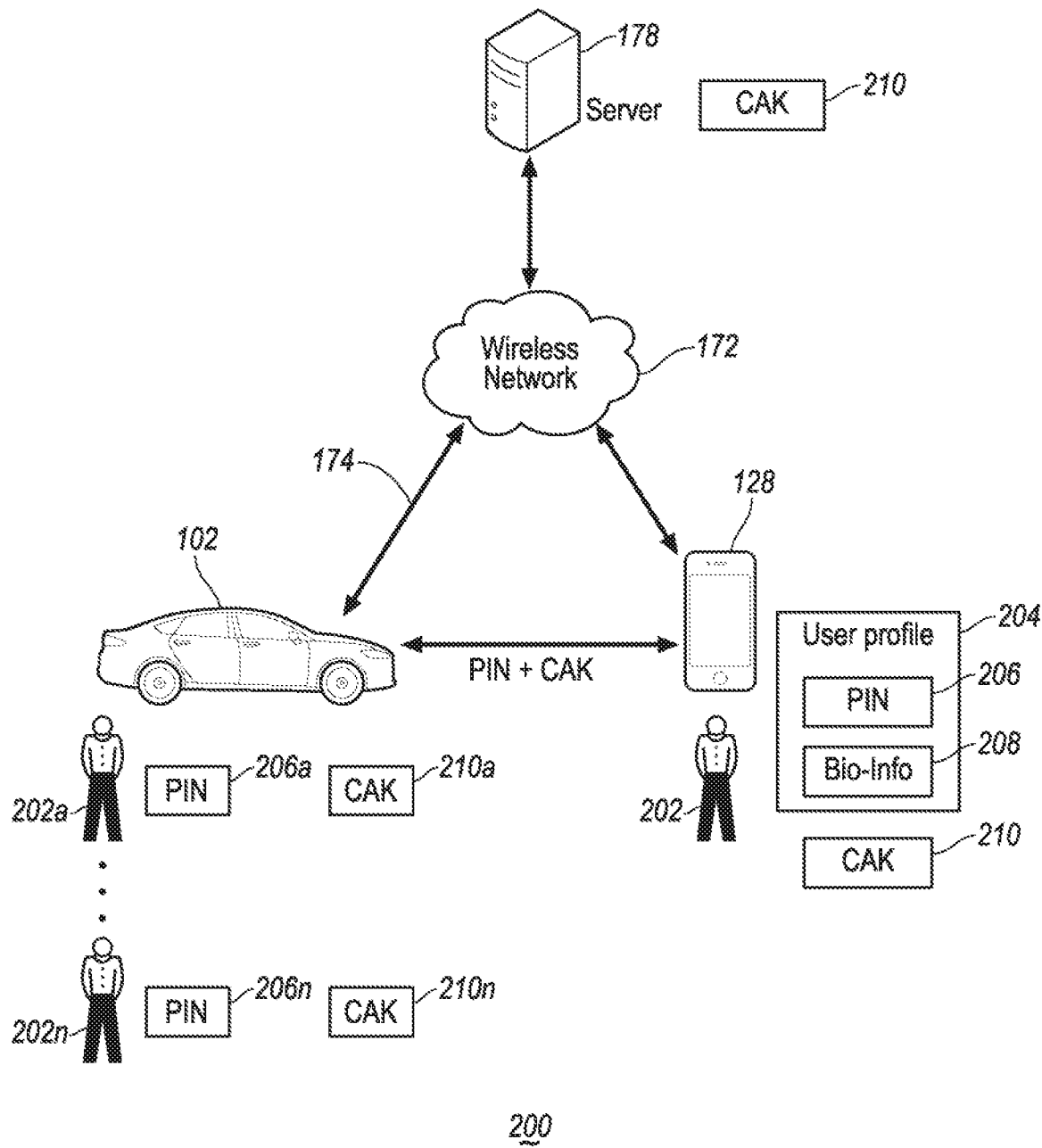
FIG. 2 illustrates an example schematic diagram of the vehicle system of one embodiment of the present disclosure.

Referring to FIG. 2, a schematic diagram 200 of one embodiment of the present disclosure is illustrated. With continuing reference to FIG. 1, in the present example, a user 202 may reserve a ride using the mobile device 128 with a hailing application as one of mobile applications 160. The mobile device 128 may further have a user profile 204 associated with the user 202 stored on the storage 158 as a part of mobile data 162. The user profile 204 may include various information related to the user 202. For instance, the user profile 204 may include a PIN of the user 202 for identifications. The PIN may consist of a limited number of digits numeral or alphanumeric characters. Upon approaching a vehicle 102 that is reserved, the user 202 may manually input the PIN 206 onto the keypad 190 of the vehicle 102 to gain access to the vehicle 102. The PIN 206 of preferably set by the user 202 for easy memorization. Alternatively, identifications such as user names may be used by the vehicle for quick access. The vehicle 102 may be programmed to display user names of reserved ride on a touch screen display 114 exterior to the vehicle 104 and ask the user to tap on the corresponding name to identify the user. The user profile 204 may further include biometric information 208 of the user 202 such as facial recognition and/or fingerprint data for further verifications.

To hail a ride, the user 202 may send a hailing request using the mobile device 128 to the server 178 via the wireless network 172. The hailing request may include the ride information such as pickup location, destination or time, as well as the user profile 204. Responsive to receiving the hailing request, the server 178 may determine which vehicle 102 is admissible to respond. The server 178 may verify, among multiple vehicles, which one is suitable for scheduling and has sufficient key access remaining. Each vehicle may have a limited capacity to accept CAKs at a given time, such that only a limited number of rides may be scheduled on a given vehicle at once. In the present example, assuming the vehicle 102 qualifies the above conditions, the server 178 selects the vehicle 102 to respond to the hailing request from the user 202 and sends a mission payload message to the vehicle 102. The mission payload message may include the CAK generated for the scheduled ride, the ride information (e.g. time and location), as well as identification of the user 202. For instance, the mission payload message may include the PIN of the user 202 to the vehicle for quick identifications. The mission payload message may further include a profile of the user indicative of a level of authorization to use the vehicle 102. Responsive to receiving the mission payload message from the server 178, the TCU 170 may gateway the message to an authentication manager for processing and storage. The authentication manager may be implemented via various components of the vehicle 102. For instance, the authentication manger may be implemented via the computing platform 104 or the ADC 180. Taking the computing platform 104 for instance, if the computing platform 104 operating as the authentication manager accepts the mission payload, an acknowledgement is sent to the server 178 noting the key delivery is complete. Additionally, the computing platform 104 may store the CAK and PIN in the storage 110. Additionally or alternatively, the computing platform 104 may map the CAK and PIN to each respective authentication module, i.e. the BLUETOOTH controller and BCM 188 respectively, for storage where the authentication manager controls digital key activity. The CAK and PIN are kept inactive until the ride is initiated, where the activation (and eventual removal post ride) may be governed by a journey manager. Alternatively, the computing platform 104 may gateway the CAK 210 to the BLUETOOTH controller 136, in case the wireless connection between the vehicle 102 and the mobile device 128 is a BLUETOOTH low energy (BLE) connection, and the PIN 206 to the BCM 188 for storage and easier access. If, however, the computing platform 104 decline the mission payload for some reasons (e.g. insufficient fuel), a response is sent to the server 178 and the server 178 may reselect another vehicle to respond the hailing request of the user 202. In addition to sending the mission payload message to the vehicle, the server 178 may send a mission message to the mobile device 128 to identify the vehicle 102 as selected. Additionally, the mission message may include the CAK 210 generated by the server for authentication with the vehicle 102. Responsive to a successful receipt and storage of the CAK, the mobile device 128 may send an acknowledgement to the server 178.

Since the PIN 206 used to access the vehicle 102 is defined by the user 202, there may be situations that two users 202 riding a single vehicle 102 have the same PIN 206. In this case, it may not be possible to identify the users 202 upon entering the PIN 206 alone. To prevent such confusion, the server 178 may be configured to perform a check against the PIN 206a of a first party 202a when scheduling additional parties 202n onto a pooled ride before sending the mission payload message to the vehicle 102. If the PIN 206n of the second user 202n is the same as the PIN 206a of the first user 202a, the server 178 may send a request for the second user 202n to create a temporary PIN for the ride. The user may enter a new PIN to use for only this particular ride. Alternatively, the server 178 may be configured to issue the temporary PIN to the second user 202n. The second user 202n may be further provided with an option to permanently change the current PIN at this time.

Since changing the PIN, either temporarily or permanently, may cause confusion to the second user 202n, the server 178 may alternatively disallow the second user 202n to be in the same vehicle 102 with the first user 202a. Instead, the server 178 may search for another vehicle 102 to respond the hailing request of the second user 202n. Alternatively, the server may require the second user 202n to provide additional identification information such as a birth day or username. In this case, the vehicle 102 may ask the user 202 to input the additional identification information after receiving the PIN 206 from the keypad 190.

Alternatively, additional identifications may be performed using the biometric information 208 of the user profile 204. The user profile 204 may be built and updated each time the user 202 successfully authenticates into the vehicle 102 by taking a photo of the face of the user via the camera 184 and uploading the photo to the server 178. The photo may be processed such that a face profile of the user 202 is generated. In the event that the user 202 encounters a PIN collision, the mobile device 128 may send the facial image of the user 202 to the server 178 for recognition to provide additional identification. Alternatively the biometric profile may be locally authenticated if the biometric profile is deployed with mission delivery.

Since the CAK 210 is generated by the server 178, CAK collisions may be rare. In case the CAK collision does happen, the server 178 may be configured to re-issue a new CAK 210 to the second user 202n to avoid the CAK collision.

Figure 3:
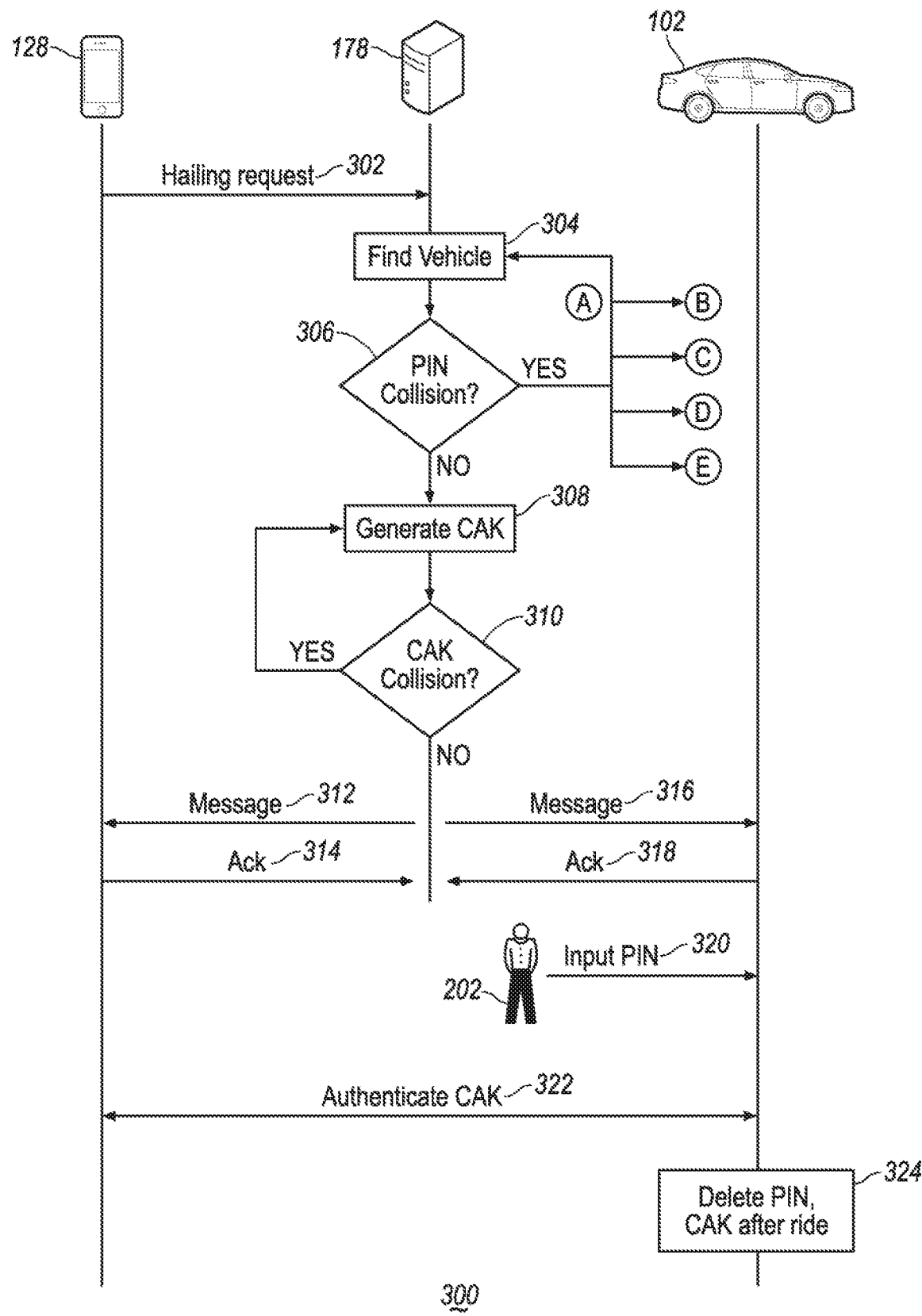
FIG. 3 illustrates a flow diagram of the vehicle system of one embodiment of the present disclosure.

Referring to FIG. 3, an example flow diagram for a ride hailing process 300 of one embodiment of the present disclosure is illustrated. With continuing reference to FIGS. 1 and 2, at operation 302, the user 202 uses the mobile device 128 to send a hailing request to the server 178 to reserve a ride. The hailing request may include various information regarding the ride requirement such as pickup time and location, as well as information about the user 202 such as a user identification and/or the full or part of the user profile 204 stored in the mobile device 128. Alternatively, the user profile 204 may be previously uploaded and stored in the server 178 and therefore does not be sent with the hailing request. Responsive to receiving the hailing request, the server 178 determines which vehicle is to respond based on the number of available CAKs of candidate vehicles. For instance, the server 178 determines the vehicle 102 should respond the hailing request of the user 202. At operation 306, the server 178 verifies the PIN 206 of the user sent along with the hailing request against PINs for other rides already assigned to the vehicle 102. If the answer is a yes, the process has various options A-E to choose from to resolve this collision. For instance, the process may return to operation 304 and the server 178 may chose another vehicle to pick up the user 202 (Option A). Options B-E will be described in detail below.

If at operation 306, the server 178 verifies there is no PIN collision, the process proceeds to operation 308 and the server 178 generates a CAK 210 for authentications between the vehicle 102 and the mobile device 128. Since the CAK 210 is computer-generated, chances for CAK collisions may be very rare. However, the server 178 may still verify the CAK 210 against existing CAKs for the vehicle 102 at operation 308. If a CAK collision is detected, the process returns to operation 308 to regenerate a CAK for the scheduled ride. Otherwise, the process proceeds to operation 312 and the server 178 sends a mission message to the mobile device 128 confirming a success reservation of the ride. At operation 314, the mobile device 128 sends an acknowledgement to the server 178 acknowledging the successful receipt of the mission message. At operation 316, the server 178 sends a mission payload message to the vehicle 102. The mission payload message may include the CAK 210 for the scheduled ride, trip information such as pickup time, location, as well as user information such as user identification, the PIN 206, biometric profile and personal settings. Additionally, the mission payload message may further include driving preference of the user such as autonomous driving or manual driving as applicable. At operation 318, the vehicle 102 sends an acknowledgement to the server 178 responsive to a successful validation of the mission payload. In case that vehicle 102 cannot accept the mission payload due to various reasons such as insufficient fuel, the vehicle 102 may send a notice to the server 178 to inform about the declination (not shown). In this case, the process returns to operation 304 to reselect a different vehicle.

Once at the vehicle 102, at operation 320, the user 202 inputs his/her PIN 206 via the keypad 190 for verification. Responsive to a successful verification of the PIN 206, the vehicle 102 identifies the user 202 and unlock the vehicle doors. Furthermore, the vehicle 102 may further identify the CAK 210 previously received and stored in the storage based on the user identification. At operation 322, the vehicle 102 authenticates the CAK 210 as associated with user 202 with the mobile device 128. Responsive to a successful authentication, the user 202 starts to ride with the vehicle 102. At operation 324, the vehicle 102 deletes the PIN 206, the CAK 210 as well as other information about the user 202 or the trip after reaching the destination of the ride.

Figure 4:
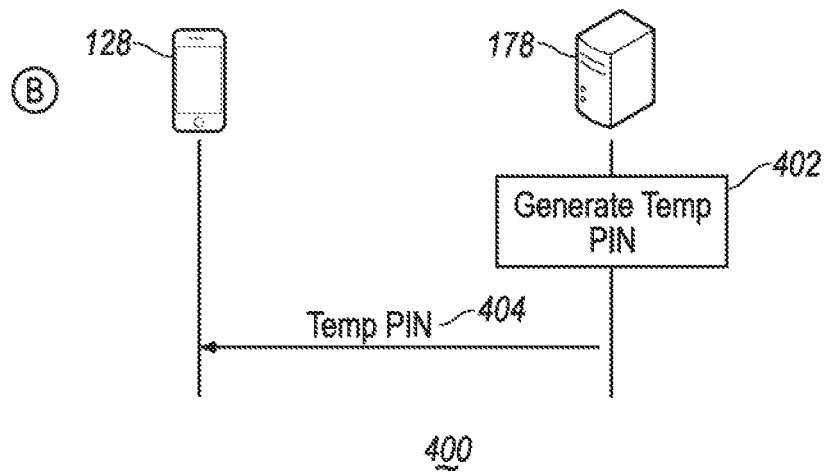
FIG. 4 illustrates a flow diagram for a process to resolve a PIN collision of one embodiment of the present disclosure.

Referring to FIG. 4, an example flow diagram for a process 400 to resolve a PIN collision of one embodiment of the present disclosure is illustrated. With continuing reference to FIG. 3, the process 400 illustrates option B following operation 306. Responsive to detecting a PIN collision at operation 306, the server 178 generates a temporary PIN for the current ride of the user 202 at operation 402. At operation 404, the server 178 sends the temporary PIN to the mobile device 128. The user 202 may use the temporary PIN for the current ride. After the ride is complete, the mobile device 128 may delete the temporary PIN from the storage. Additionally, the server 178 sends the temporary PIN instead of the user PIN 206 to the vehicle for verification.

Figure 5:
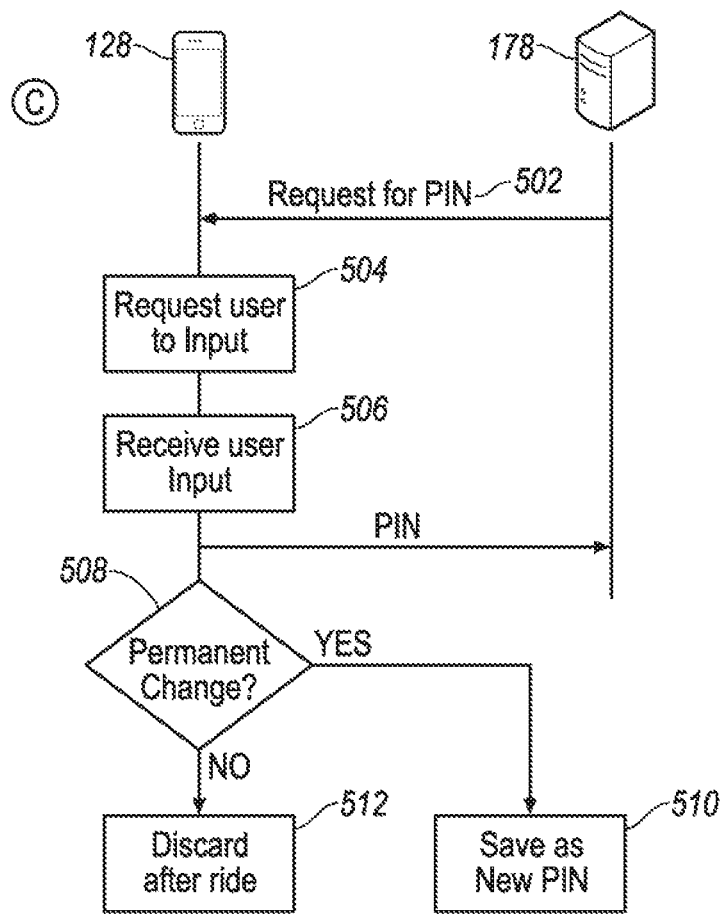
FIG. 5 illustrates a flow diagram for a process to resolve a PIN collision of another embodiment of the present disclosure.

Referring to FIG. 5, an example flow diagram for a process 500 to resolve a PIN collision of another embodiment of the present disclosure is illustrated. With continuing reference to FIG. 3, the process 500 illustrates option C following operation 306. Responsive to detecting a PIN collision at operation 306, the server 178 sends a request for PIN to the mobile device to ask the user to input another PIN. Responsive to receiving the request, at operation 504, the mobile device 128 outputs a message to ask the user to manually input a new PIN via an interface. At operation 506, the mobile device 128 receives a new PIN by the user 202. At operation 508, the mobile device 128 askes if the user wants to use the new PIN as a permanent PIN. If the user selects yes, the process proceeds to operation 510 and the mobile device 128 saves the new PIN as permanent to replace the old one. Otherwise, the process proceeds to operation 512 and the mobile device 128 only use the new PIN for the current ride. After the ride is complete, the new PIN is discarded.

Figure 6:
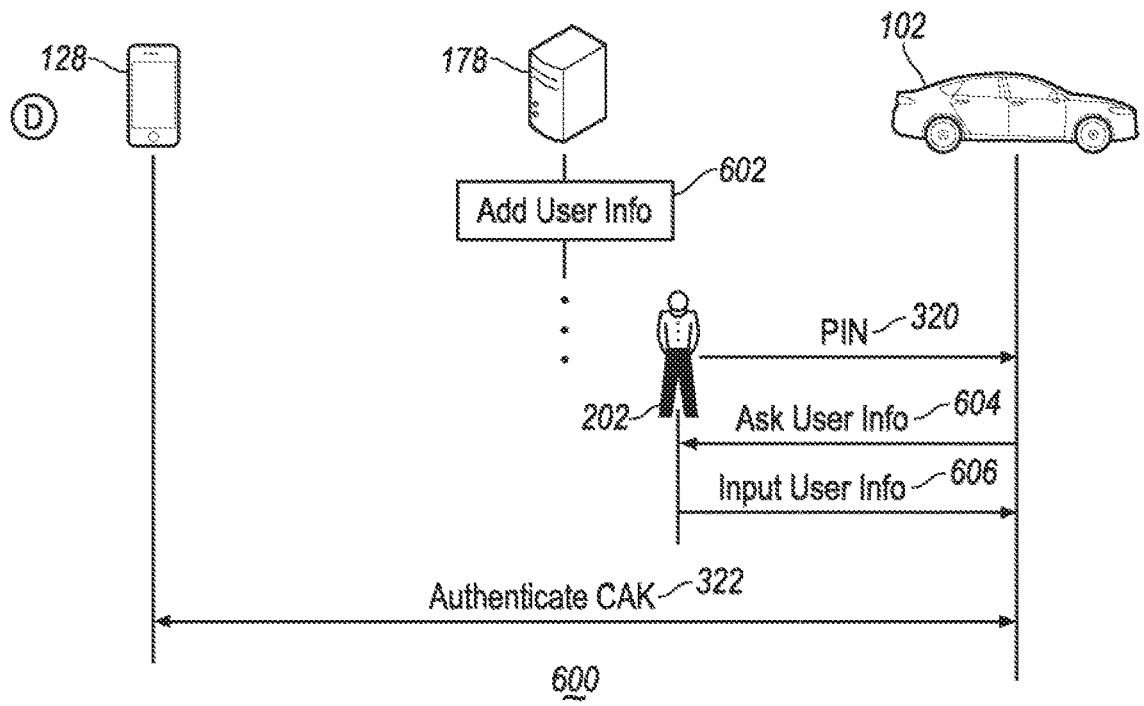
FIG. 6 illustrates a flow diagram for a process to resolve a PIN collision of yet another embodiment of the present disclosure.

Referring to FIG. 6, an example flow diagram for a process 600 to resolve a PIN collision of another embodiment of the present disclosure is illustrated. With continuing reference to FIG. 3, the process 600 illustrates option D following operation 306. Responsive to detecting a PIN collision at operation 306, the server 178 adds user information to the mission payload message for the vehicle 102 to perform additional authentication in addition to the PIN. The user information may include additional information included associated with user profile, such as a birth day, a security question or the like. After the user inputting the PIN 206 at operation 320, the vehicle 102 prompts questions to ask the user 202 to provide the additional user information for further authentication at operation 604. At operation 606, the user 202 inputs the additional user information via the keypad 190. Responsive to a successful verification and identification of the user 202, the process proceeds to operation 322 to authenticate the CAK.

Figure 7:
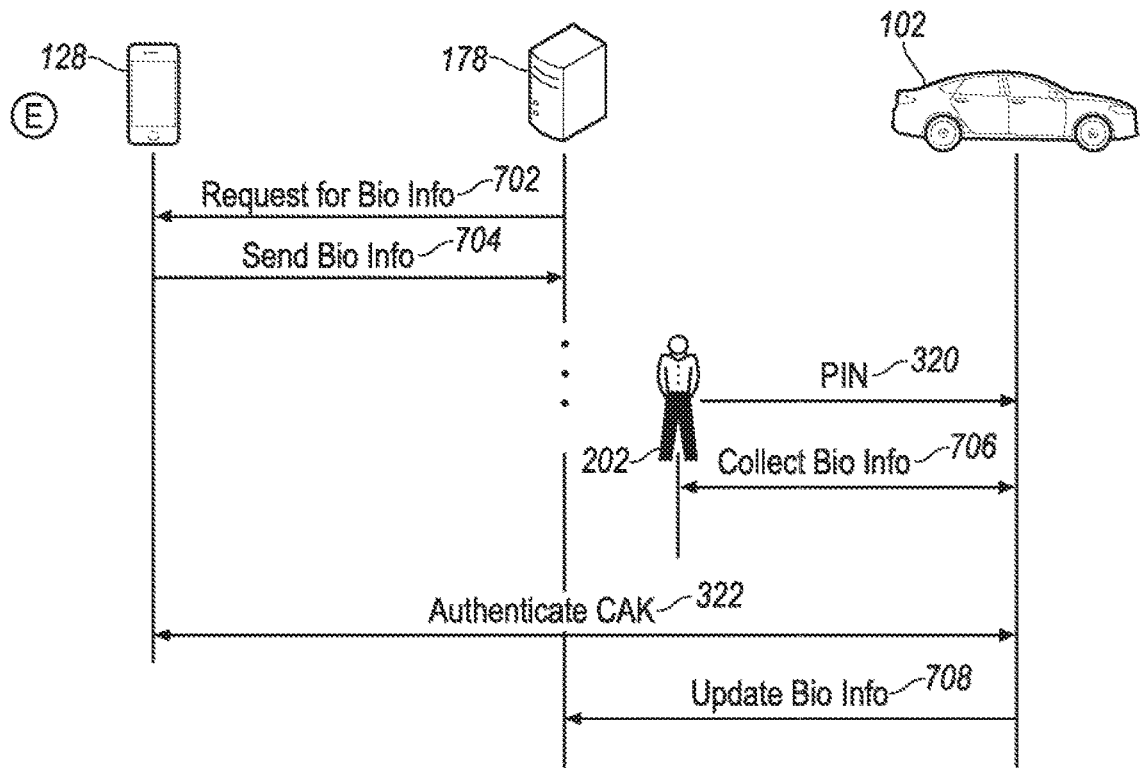
FIG. 7 illustrates a flow diagram for a process to resolve a PIN collision of yet another embodiment of the present disclosure.

Referring to FIG. 7, an example flow diagram for a process 700 to resolve a PIN collision of another embodiment of the present disclosure is illustrated. With continuing reference to FIG. 3, the process 700 illustrates option E following operation 306. Responsive to detecting a PIN collision at operation 306, at operation 702, the server 178 sends a request for biometric information to the mobile device 128. This operation may be optional as the server 178 may already have the biometric information 208 of the user 202. Alternatively, biometric information 208 may be send to the server 178 along with the hailing request at operation 302. Responsive to receiving the request for biometric information, at operation 704, the mobile device 128 sends the biometric information 208 to the server 178. After the user entering the PIN 206, at operation 706, the vehicle 102 collects the biometric data of the use 202 via sensors such as the fingerprint reader 186 and the camera 184, and verifies the data via the biometric controller 182. Responsive to a successful verification, the process proceeds to operation 322 to authenticate the CAK 210. Additionally, at operation 708, the vehicle 102 sends the collected biometric data of the user 202 as an update to the server 178. For instance, the facial image of the user 202 captured by the vehicle camera may be have different characteristics compared with the version captured by the mobile device camera. The updated biometric information from the vehicle 102 may help the server 178 build a more comprehensive and robust database to verifications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server, comprising:
one or more processors including one or more hardware circuits, programmed to
responsive to receiving, from a mobile device of a user, a hailing request that identifies the user as requesting to schedule a ride, verify a capacity to accept an encryption key on a plurality of vehicles to determine if any of the vehicles has an available ride to accommodate the hailing request,
responsive to verifying a vehicle of the plurality of vehicles having the capacity, select the vehicle to respond to the hailing request, the hailing request including a user profile, the user profile including a user passcode,
generate an encryption key to authenticate the mobile device of the user with the vehicle,
send the encryption key to both the vehicle and the mobile device to schedule the ride,
verify if the user passcode collides with any existing passcode of a different user scheduled to ride with the vehicle, and
responsive to verifying the user passcode collides with an existing passcode, send biometric information of the user to the vehicle to provide a secondary verification, and
responsive to receiving an updated biometric information collected by the vehicle, revise the biometric information with the updated biometric information,
verify the encryption key against other existing encryption keys of a different users scheduled to ride with the vehicle to detect an encryption key collision, and
responsive to detecting the encryption key collision, regenerate a new encryption key to authenticate the scheduled ride between the mobile device and the vehicle.

2. The server of claim 1, wherein the one or more processors are further programmed to:
send a request for biometric information to the mobile device; and
receive the biometric information from the mobile device.

3. The server of claim 2, wherein the one or more processors are further programmed to:
send the updated biometric information to the mobile device.

4. The server of claim 1, wherein the one or more processors are further programmed to:
responsive to verifying the user passcode collides with an existing passcode, select another vehicle to respond to the hailing request of the user.

5. The server of claim 1, wherein the one or more processors are further programmed to:
responsive to verifying the user passcode collides with an existing passcode, generate a second passcode; and
send the second passcode to both the vehicle and the mobile device for verification.

6. The server of claim 1, wherein the one or more processors are further programmed to:
responsive to verifying the user passcode collides with an existing passcode, send a request for new passcode to the mobile device; and
responsive to receiving a new passcode from the mobile device, send the new passcode to the vehicle for verification.

7. The server of claim 1, wherein the hailing request further includes additional authentication information of the user, and the one or more processors are further programmed to:

responsive to verifying the user passcode collides with an existing passcode, send the additional authentication information to the vehicle to provide an additional verification.

8. The server of claim 7, wherein the additional authentication information includes at least one of: a birthday, or a security question.

9. A method for a server, comprising:

responsive to receiving, from a mobile device, a hailing request including a user passcode and identifying the user as requesting to schedule a ride, verifying a capacity to accept an encryption key on a plurality of vehicles to determine if any of the vehicles has an available ride to accommodate the hailing request, selecting a vehicle of the plurality of vehicles to respond to the hailing request based on verifying the vehicle has a capacity to accept an encryption key;

verifying the user passcode against an existing passcode of a different user scheduled to ride with the vehicle to detect a passcode collision;

responsive to detecting a passcode collision, obtaining biometric information of the user from the mobile device;

generating an encryption key to authenticate the mobile device with the vehicle;

sending the passcode, the encryption key, and the biometric information of the user to the vehicle;

receiving a biometric data update collected by a sensor of the vehicle and store the biometric data update for future use;

verifying the encryption key against other existing encryption keys of a different users scheduled to ride with the vehicle to detect an encryption key collision; and responsive to detecting the encryption key collision, regenerating a new encryption key to authenticate the scheduled ride between the mobile device and the vehicle.

10. The method of claim 9, wherein the biometric information includes at least one of: a fingerprint, or a facial image of the user.

11. The method of claim 9, further comprising:

responsive to detecting a passcode collision, requesting the mobile device to provide additional authentication information; and responsive to receiving the additional authentication information as requested, sending the additional authentication information to the vehicle to provide a secondary verification.

* * * * *